United States Patent [19]

Stephenson

[11] Patent Number: 5,720,610
[45] Date of Patent: Feb. 24, 1998

[54] PHOTOFLASH LAMP ARRAY

[75] Inventor: Stanley W. Stephenson, Spencerport, N.Y.

[73] Assignee: Eastman Kodak Company, Rochester, N.Y.

[21] Appl. No.: 744,782

[22] Filed: Nov. 6, 1996

[51] Int. Cl.⁶ ........................................ F21K 5/00
[52] U.S. Cl. ............................... 431/365; 362/11
[58] Field of Search ......................... 431/357, 365; 362/11, 15

[56] References Cited

U.S. PATENT DOCUMENTS

| | | | |
|---|---|---|---|
| 2,279,880 | 4/1942 | deMargitta | 431/358 |
| 2,280,048 | 4/1942 | Schwarze | 431/358 |
| 2,393,711 | 1/1946 | Schwarze . | |
| 3,280,601 | 10/1966 | Ostrow | 431/365 |
| 3,873,260 | 3/1975 | Cote | 431/95 |
| 4,233,023 | 11/1980 | Johnson et al. | 431/362 |
| 4,347,053 | 8/1982 | Fohl et al. | 431/359 |

FOREIGN PATENT DOCUMENTS 781865  5/1935  France .

*Primary Examiner*—Carroll B. Dority
*Attorney, Agent, or Firm*—Thomas H. Close

[57] ABSTRACT

A compact photoflash lamp array, includes a substrate having a plurality of electrical conductors leading to an array of igniter links with a combustible mass deposited over each igniter link. A grid is bonded to the substrate for forming a corresponding array of combustion cavities, each of the cavities having reflective walls. A sheet of transparent material is bonded over the grid to form the array of photoflash lamps.

11 Claims, 3 Drawing Sheets

PHOTOFLASH LAMP ARRAY

CROSS-REFERENCE TO RELATED APPLICATIONS

The present application is related to U.S. application Ser. No. 08/769,338, filed Dec. 19, 1996, by Stanley W. Stephenson, and entitled, "Improved Photoflash Particle Mixture".

FIELD OF THE INVENTION

The invention relates generally to the field of photography, and in particular to compact photoflash lamps containing combustible material.

BACKGROUND OF THE INVENTION

U.S. Pat. No. 4,233,023 issued Nov. 11, 1980 to Johnson et al. discloses a compact photoflash lamp having a substrate supporting electrically conductive wires and a fuse wire for igniting a combustible mass. The combustible mass includes one or more combustible metals such as zirconium, magnesium or aluminum in the form of shredded foil granules or powder mixed together with a solid oxidant such a chlorate or perchlorate. The combustible mass is contained in a recess in the substrate. One of the problems associated with such compact photoflash lamps is containing the combustion products of the combustible mass. The solution proposed by Johnson et al. is an expandable membrane disposed over the recess containing the combustible mixture. A shortcoming with this solution is that that the integrity of the membrane is not reliable under the temperatures and pressures encountered in the vicinity of the combustible mass. An additional problem with the flash lamp of Johnson et al. is that a significant quantity of light is lost outside of the area of photographic interest. There is a need therefore for an improved compact flash structure.

SUMMARY OF THE INVENTION

The present invention is directed to overcoming one or more of the problems set forth above. Briefly summarized, according to one aspect of the present invention, a compact photoflash lamp array, includes a substrate having a plurality of electrical conductors leading to an array of igniter links with a combustible mass deposited over each igniter link. A grid is bonded to the substrate for forming a corresponding array of combustion cavities, each of the cavities having reflective walls. A sheet of transparent material is bonded over the grid to form the array of photoflash lamps.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention is advantageous in that it provides a compact low cost photoflash lamp array having improved reliability and efficiency.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
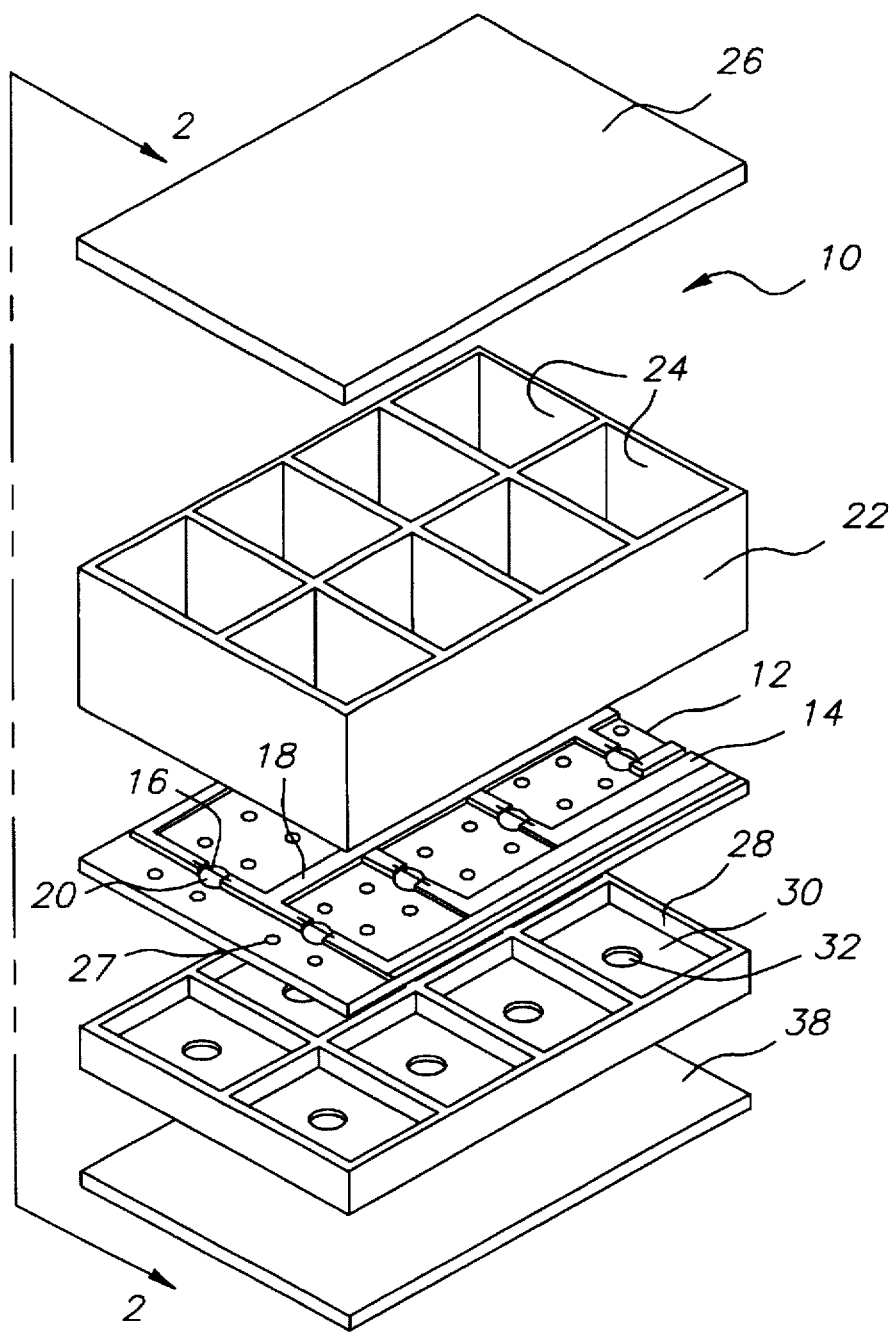
FIG. 1 is a an exploded perspective view of a compact photoflash lamp array according to the present invention.
Figure 2:
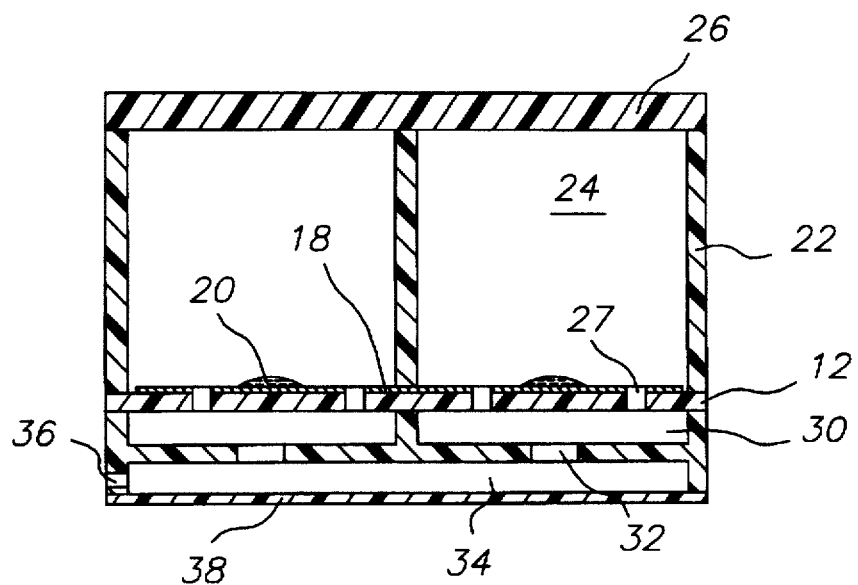
FIG. 2 is a cross sectional view of the photoflash lamp array shown in FIG. 1 taken along line 2—2.

Referring to FIGS. 1 and 2, a photoflash lamp array generally designated 10 includes a substrate 12 having a plurality of electrical conductors 14 leading to an array of igniter links 16. The substrate 12 is preferably conventional fiber reinforced polymeric circuit board material. The electrical conductors 14 are standard circuit board traces of copper approximately 1.25 mm wide. The igniter links 16 are 25 µm diameter copper wire, soldered across to the electrical conductors 14. In the example shown in FIG. 2, one conductor 18 provides a common return for the other conductors. A combustible mass 20 is deposited over each igniter link 16. It has been found to be important to completely cover the igniter link 16 with the combustible mass 20. Preferably, the combustible mass 20 is a mixture of coarsely powdered zirconium (−320 sieve), finely powdered zirconium (5 µm zirconium dust), an oxidizer such as a chlorate or perchlorate (preferably −200 and +400 sieve potassium perchlorate), and polymeric binder (preferably polyacrilamide PAA) all dispersed in water. A mass of 22 to 40 mg (preferably 35 mg) of the resulting slurry are deposited onto the igniter link 16 and oven dried at 90° C. for 24 hours. The resulting combustible mass 20 is capable of ignition with a single alkaline AA battery to produce approximately 120 candela seconds of illumination.

A grid 22 defining a plurality of chambers 24 is bonded to the surface of the substrate 12. The chambers 24 are approximately 1 cc in volume. Preferably, grid 24 is an acrylic polymer loaded with a high concentration of titanium dioxide or other filler that has high reflectivity. Alternatively, the grid 22 is a plastic that is vacuum coated with reflective aluminum. In a further embodiment, the plastic grid is coated with a highly reflective electroless nickel coating. In a still further embodiment, the grid 22 is formed as an aluminum extrusion that is chemically polished. In a still further embodiment, the grid is chemically polished die cast aluminum. The grid 22 is bonded to the substrate by an adhesive such as an epoxy resin or a silicone rubber adhesive. A sheet of transparent material 26 is bonded to the top of the grid 22 to complete the enclosures for the photoflash lamps in the assembly. The transparent sheet may be, for example, 1 mm thick glass, 0.5 mm thick glass coated plastic with the glass coating on the inside of the chamber, or 0.5 mm thick acrylic. The transparent sheet 26 is bonded to the grid 22 with an adhesive such as epoxy or silicone rubber.

In a preferred embodiment of the photoflash lamp array, the substrate 12 is perforated with vent holes 27 adjacent each combustible mass 20. In one arrangement four 1.25 mm diameter perforations are arranged symmetrically around each combustible mass 16. The perforations allow the combustion by products to escape from the chambers 24 formed by the grid 22. To prevent the escaping gasses from one chamber from igniting the combustible masses in adjacent chambers, the gasses are baffled by a baffle structure 28. The baffle structure 28 forms individual first venting chambers 30 of approximately 0.25 cc in volume. The gasses then pass out through a vent opening 32 approximately 2.50 mm in diameter into a common chamber 34 having a volume approximately equal to the sum of the volumes of the first venting chambers 30. The gasses then pass to the atmosphere through vent holes 36. The vent holes 27, 32 and 36 are arranged such that the escaping gas from combustible mass 16 must follow a circuitous path exiting the array. The back of the common chamber 34 may be formed by a plate 38 of any suitable material such as plastic or metal and may be an integral portion of a camera body. The baffle structure 28 may be formed for example from polycarbonate plastic with wall structures approximately 1 mm thick, and is bonded to the back of the substrate 12 with epoxy or silicone rubber adhesive.

Figure 3:
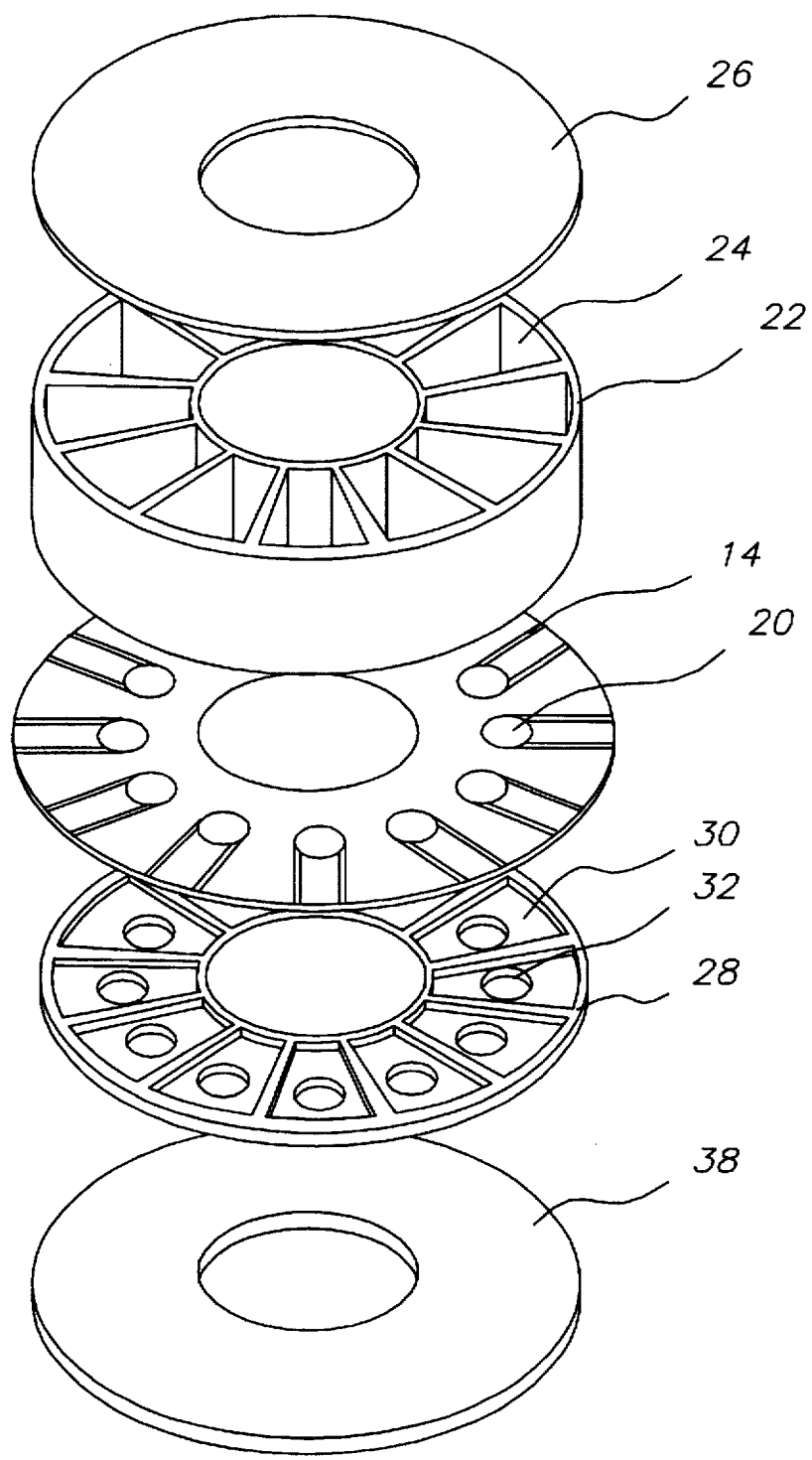
FIG. 3 is a an exploded perspective view of an alternative embodiment of a photoflash lamp array according to the present invention.

FIG. 3 is an exploded perspective view of a photoflash lamp array according to the present invention wherein the chambers are arranged in a circular pattern. The electrical conductors 14 are arranged to be accessible from the periphery of the array, whereby they may be consecutively addressed by contacts in a mechanism that rotates the flashlamp array in a camera.

Figure 4:
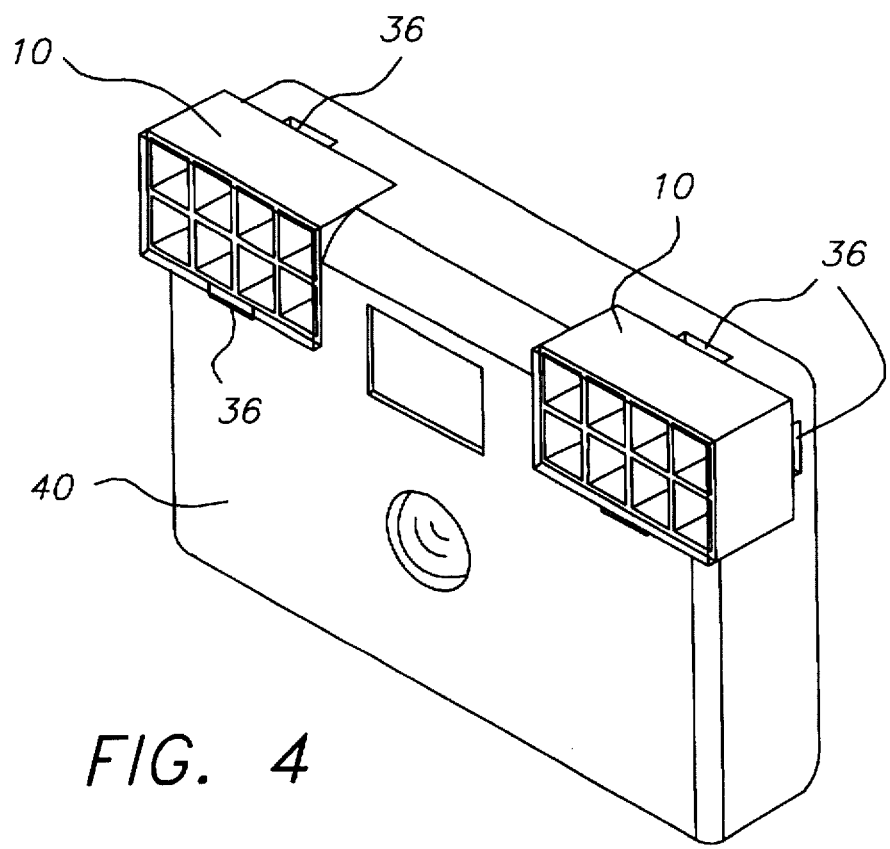
FIG. 4 is a perspective view of a single-use camera incorporating a pair of photoflash lamp arrays according to the present invention.

As shown in FIG. 4, the flashlamp array 10 may be incorporated as an integral part of a single use camera 40. The vent holes 36 are provided in the body of the camera 40.

The invention has been described with reference to a preferred embodiment. However, it will be appreciated that variations and modifications can be effected by a person of ordinary skill in the art without departing from the scope of the invention.

PARTS LIST 10 photo flash lamp array
12 substrate
14 electrical conductors
16 igniter links
18 common return
20 combustible mass
22 grid
24 chambers
26 transparent sheet
27 vent holes
28 baffle structure
30 first venting chambers
32 vent opening
34 common chamber
36 vent holes
38 backing plate
40 single use camera

I claim:

1. A compact photo flash lamp array, comprising:
   a) a substrate having a plurality of electrical conductors leading to an array of igniter links;
   b) a combustible mass deposited over each igniter link;
   c) a grid, bonded to the substrate, the grid defining a corresponding array of combustion cavities having reflective walls; and
   d) a sheet of transparent material bonded over the grid.

2. The compact photoflash lamp array claimed in claim 1, further comprising:
   e) the substrate having a vent adjacent each combustible mass;
   f) a baffle structure bonded to the back side of the substrate, the baffle structure forming a corresponding array of baffle chambers, each leading to a common baffle chamber, the common baffle chamber having a vent to atmosphere.

3. The compact photo flash lamp array claimed in claim 1, wherein the grid is polished aluminum.

4. The compact photoflash lamp array claimed in claim 1, wherein the grid is titanium dioxide loaded plastic.

5. The compact photoflash lamp array claimed in claim 1, wherein the grid is reflective metal coated plastic.

6. The compact photoflash lamp array claimed in claim 1, wherein the sheet of transparent material is glass.

7. The compact photoflash lamp array claimed in claim 1, wherein the sheet of transparent material is clear acrylic plastic.

8. The compact photoflash lamp array claimed in claim 1, wherein the sheet of transparent material is glass coated plastic.

9. The compact photoflash lamp array claimed in claim 1, wherein the substrate is fiber reinforced circuit board material.

10. The compact photoflash lamp array claimed in claim 1, wherein the combustible mass is finely divided zirconium powder and potassium perchlorate in polymeric binder.

11. The compact photoflash lamp array claimed in claim 2, wherein the photoflash lamp array is an integral part of a single use camera.

* * * * *